US011067851B2

(12) United States Patent
Ishida et al.

(10) Patent No.: US 11,067,851 B2
(45) Date of Patent: Jul. 20, 2021

(54) LIGHT-EMITTING APPARATUS AND DISPLAY APPARATUS

(71) Applicant: CANON KABUSHIKI KAISHA, Tokyo (JP)

(72) Inventors: Tetsuya Ishida, Kawasaki (JP); Hironobu Hoshino, Machida (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/988,151

(22) Filed: Aug. 7, 2020

(65) Prior Publication Data

US 2021/0041744 A1 Feb. 11, 2021

(30) Foreign Application Priority Data

Aug. 9, 2019 (JP) .............................. JP2019-147579

(51) Int. Cl.
*G02F 1/13357* (2006.01)
*G02F 1/1335* (2006.01)

(52) U.S. Cl.
CPC .. *G02F 1/133603* (2013.01); *G02F 1/133605* (2013.01); *G02F 1/133612* (2021.01)

(58) Field of Classification Search
CPC ......... G02F 1/133603; G02F 1/133605; G02F 2001/133612
See application file for complete search history.

(56) References Cited

U.S. PATENT DOCUMENTS

| 7,638,754 | B2 | 12/2009 | Morimoto et al. | |
| 9,661,721 | B2 | 5/2017 | Kurita | |
| 2008/0245949 | A1* | 10/2008 | Morimoto | G01J 3/51 250/205 |
| 2009/0021181 | A1* | 1/2009 | Brune | H05B 45/10 315/291 |
| 2010/0271565 | A1* | 10/2010 | Suminoe | H05B 45/40 349/61 |
| 2019/0232080 | A1* | 8/2019 | Beerwerth | A61N 5/0616 |

FOREIGN PATENT DOCUMENTS

| JP | 2007-180524 A | 7/2007 |
| JP | 2018-032586 A | 3/2018 |

* cited by examiner

*Primary Examiner* — Evan P Dzierzynski
(74) *Attorney, Agent, or Firm* — Cowan, Liebowitz & Latman, P.C.

(57) ABSTRACT

A light-emitting apparatus according to the present invention, includes: a light source board on which a first light source group including a plurality of light sources and a sensor that detects light or temperature are disposed; and a reflection sheet that is disposed on a side of the light source board where the first light source group and the sensor are disposed, and includes an opening from which the first light source group is exposed, wherein the sensor is surrounded by the plurality of light sources.

13 Claims, 6 Drawing Sheets

LIGHT-EMITTING APPARATUS AND DISPLAY APPARATUS

BACKGROUND OF THE INVENTION

Field of the Invention

The present invention relates to a light-emitting apparatus and a display apparatus, and more particularly to an arrangement of light sources and sensors.

Description of the Related Art

In a liquid crystal display apparatus, a backlight module is disposed on the rear surface side of a liquid crystal panel. The backlight module emits light to the rear surface of the liquid crystal panel, and a part of the light emitted from the backlight module transmits through the liquid crystal panel, whereby an image is displayed. Light-emitting diodes (LEDs) or the like are used as the light sources of the backlight module, and a reflection sheet, to reflect the light emitted from the light sources to the liquid crystal panel side, is disposed around the light sources. Furthermore, a diffusion space, to diffuse light emitted from the light sources and the optical sheet to shape the light and emit the light to the liquid crystal panel, exist between the liquid crystal panel and the backlight module.

As light is emitted from a light source, such as LED, the light source generates heat and the temperature of the light source changes. The light-emitting characteristic of the light source (e.g. light quantity of the light source) changes depending on the temperature of the light source, hence if the temperature of the light source changes, the light-emitting characteristic of the light source must be corrected. Conventionally to correct the light emission of the light source, a temperature sensor, a brightness sensor or the like is disposed on a light source board on which each light source is disposed, and the light quantity (brightness), the temperature and the like of the light source (vicinity of the light source) are detected using these sensors.

In recent years, brightness of liquid crystal display apparatuses is increasing. The brightness of a liquid crystal display apparatus is increased using many light sources in the backlight module, or by increasing the light-emitting efficiency of the backlight module. A technique to increase the light-emitting efficiency of the backlight module is disclosed in Japanese Patent Application Publication No. 2007-180524, for example. According to the technique disclosed in Japanese Patent Application Publication No. 2007-180524, a plurality of openings corresponding to a plurality of light source groups on a one-to-one basis are formed as the openings of the reflection sheet.

However in the case of installing the sensors by a conventional installation method, it is necessary to form openings for the sensors in the reflection sheet separately from the openings for the light source groups, even if the technique disclosed in Japanese Patent Application Publication No. 2007-180524 is used. Therefore the total surface area of the plurality of openings formed in the reflection sheet increases, and the light-emitting efficiency of the backlight module drops.

SUMMARY OF THE INVENTION

The present invention provides a technique to suppress a drop in the light-emitting efficiency of a light-emitting apparatus caused by installing sensors in the light-emitting apparatus.

A light-emitting apparatus according to the present invention, includes:

a light source board on which a first light source group including a plurality of light sources and a sensor that detects light or temperature are disposed; and a reflection sheet that is disposed on a side of the light source board where the first light source group and the sensor are disposed, and includes an opening from which the first light source group is exposed, wherein the sensor is surrounded by the plurality of light sources.

A display apparatus according to the present invention, includes:

the above mentioned light-emitting apparatus; and a display panel that displays an image by transmitting light emitted from the light-emitting apparatus.

Further features of the present invention will become apparent from the following description of exemplary embodiments with reference to the attached drawings.

DESCRIPTION OF THE EMBODIMENTS

Embodiment 1

Embodiment 1 of the present invention will be described. An example of applying the present invention to a backlight module of a liquid crystal display apparatus will be described, but a display apparatus equipped with a light-emitting apparatus to which the present invention is applicable is not limited to a liquid crystal display apparatus. For example, the present invention may be applied to a light-emitting apparatus included in another transmission type display apparatus, such as a micro electro mechanical system (MEMS) shutter type display apparatus which uses MEMS shutters instead of liquid crystal elements. The present invention is also applicable to an illumination apparatus, an advertisement display apparatus, a sign apparatus and the like. In Embodiment 1, in the display apparatus, a surface having a display surface on which an image is displayed is defined as the "front surface", the surface on the opposite side of the front surface is defined as the "rear surface", and viewing the display apparatus facing the front surface is defined as the "front view".

Figure 1:
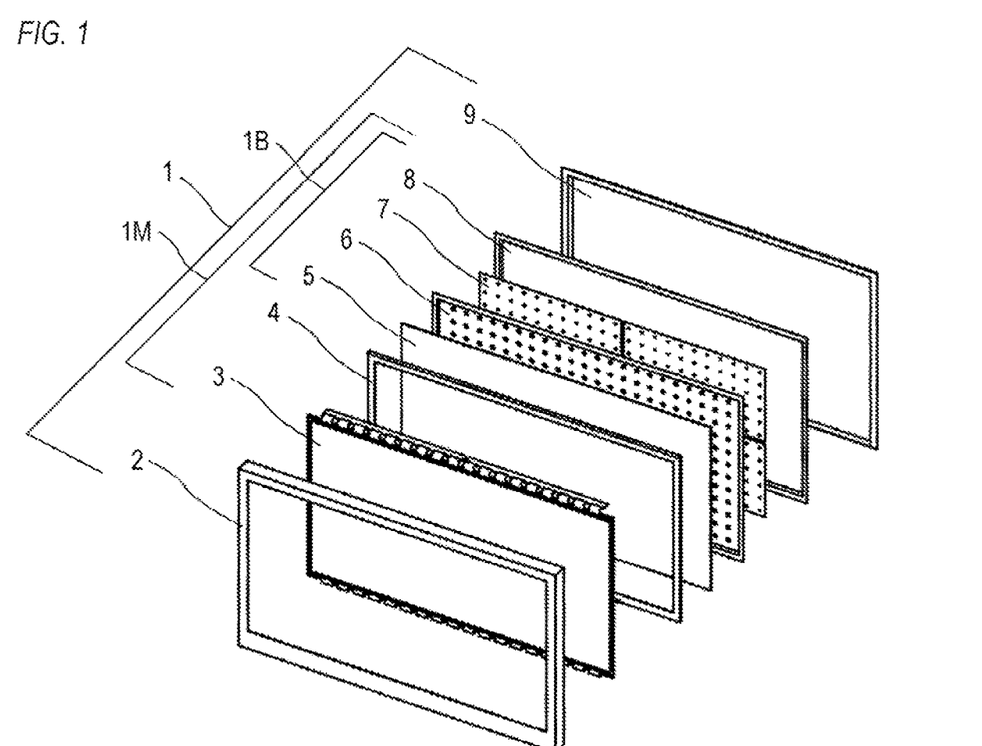
FIG. 1 is an exploded perspective view of a display apparatus according to Embodiment 1.

FIG. 1 is an exploded perspective view of a display apparatus 1 according to Embodiment 1. A bezel 2 is a member to be an exterior on the front surface side, and a rear cover 9 is a member to be an exterior on the rear surface side. By joining the edge of the rear cover 9 and the edge of the bezel 2, an approximately box-shaped exterior is formed. The bezel 2 is normally formed by metal (e.g. aluminum, iron) or resin molding, and the rear cover 9 is normally formed by press processing sheet metal or resin molding. A liquid crystal panel 3 is a display panel that is disposed inside the above mentioned box-shaped exterior. The liquid crystal panel 3 has a display surface, and at least a part of the display surface is a display area where an image is displayed. The bezel 2 has an opening where the display area is exposed.

A display module 1M is disposed between the bezel 2 and the rear cover 9. The display module 1M includes the liquid crystal panel 3 having a display surface (display area) where an image is displayed by transmitting light emitted to the rear surface, and a backlight module 1B which emits light to the rear surface of the liquid crystal panel 3. The backlight module 1B includes a light source board 7 on which a plurality of light sources are disposed, and a backlight case 8 which stores the light source board 7. A reflection sheet 6 is disposed on the front surface side (light-emitting direction) of the light source board 7. An optical sheet 5 is disposed on the front surface side (liquid crystal panel 3 side) of the reflection sheet 6. The optical sheet 5 is a member that diffuses light from the light source board 7, so that the backlight module 1B functions as a surface light source. Further, the optical sheet 5 is also a member to improve the front surface brightness (brightness of light emitted in the direction to the front surface) of the backlight module 1B by condensing the light from the light source board 7. The optical sheet 5 is constituted of (including) at least one sheet. A panel holder 4 is disposed on the front surface side (liquid crystal panel 3 side) of the optical sheet 5. The panel holder 4 supports the optical sheet 5 and the liquid crystal panel 3 from the rear surface. A circuit board (not illustrated) is disposed on the rear surface of the backlight case 8. For the circuit board, a light source control board to drive the light source board 7 (a plurality of light sources), a liquid crystal control board to drive the liquid crystal panel 3, an image processing board to receive image signals inputted from the outside and perform image processing, and a power supply board to supply power, for example, are disposed. The circuit board is covered by a rear cover 9 from the rear surface side.

Figure 2:
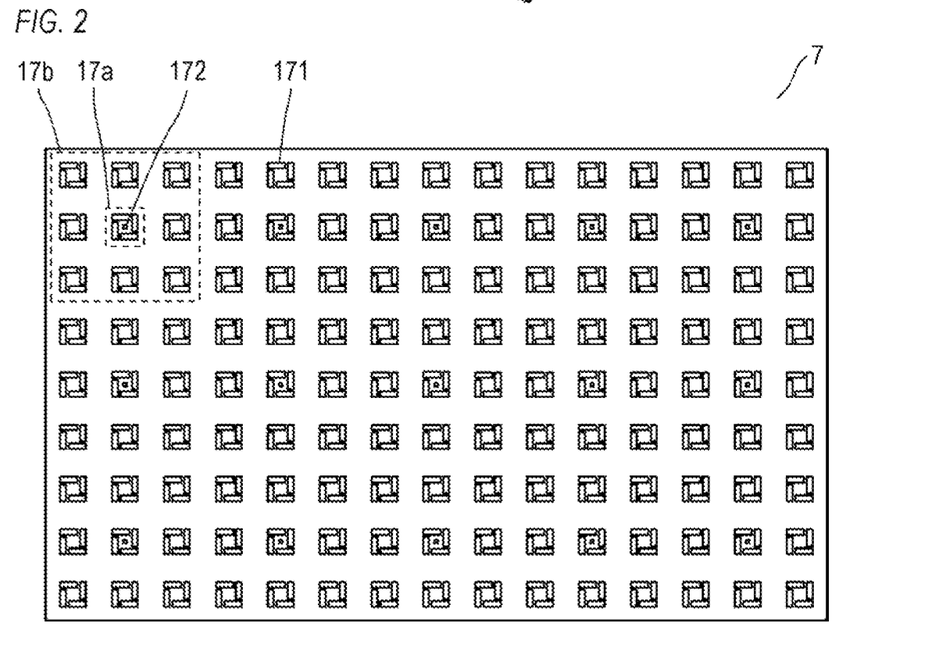
FIG. 2 is a front view of a light source board according to Embodiment 1.

FIG. 2 is a front view of the light source board 7. A plurality of LEDs 171 as a plurality of light sources are disposed on the light source board 7. In concrete terms, at least one light source array 17a, which is a light source group constituted of (including) a plurality of LEDs 171, is disposed on the light source board 7. FIG. 2 indicates an example when a plurality of light source arrays 17a are disposed. A number of LEDs 171 included in one light source array 17a is not especially limited, but in FIG. 2, one light source array 17a includes four LEDs 171. A light-emitting surface of each light source array 17a is approximately parallel with the light source board 7. In Embodiment 1, the term "approximately (substantially)" includes the meaning of "perfectly", and the light-emitting surface may or may not be perfectly parallel with the light source board 7. The LED 171 included in the light source array 17a is a white LED which emits white light, for example. The light source array 17a may include a plurality of LEDs which emit different colors of light, such as red, green, blue, as the LEDs 171 individually. At least one temperature sensor 172 which detects temperature is disposed in the light source board 7. At least one temperature sensor 172 is disposed so that the light source array 17a and the temperature sensor 172 correspond to each other one-to-one for a part or all of the plurality of light source arrays 17a.

The plurality of light source arrays 17a are used for a plurality of light-emitting control blocks 17b, each of which is a light source group constituted of (including) at least one light source array 17a. A light source control board (not illustrated) individually controls the light emission (at least one of brightness (light quantity) and color) of each light-emitting control block 17b based on the temperature (detection value) detected by a temperature sensor 172. For example, as the temperature of an LED 171 increases, the light-emitting efficiency of this LED 171 decreases. Therefore in the case where the temperature detected by the temperature sensor 172 is high, the power (drive power) to drive the LED 171 is increased, or the time (supply time) to supply the drive power to the LED 171 is increased, so as to correct the drop in the light-emitting efficiency of the LED 171. The control of the level of the drive power is called the "pulse amplitude modulation (PAM) control", and the control of the drive time length is called the "pulse width modulation (PWM) control". The light source control board may individually control the light emission of each light-emitting control block 17b based on the image signal (characteristic value, such as brightness value) inputted to the display apparatus 1 (local dimming control). A number of light source arrays 17a included in one light-emitting control block 17b is not especially limited, but in FIG. 2, nine light source arrays 17a are included in one light-emitting control block 17b. A number of temperature sensors 172 is not especially limited either. In FIG. 2, respective temperature sensors 172 are disposed in a plurality of light-emitting control blocks 17b, so that the light-emitting control block 17b corresponds to the temperature sensor 172 one-to-one in all the light-emitting control blocks 17b.

Figure 3:
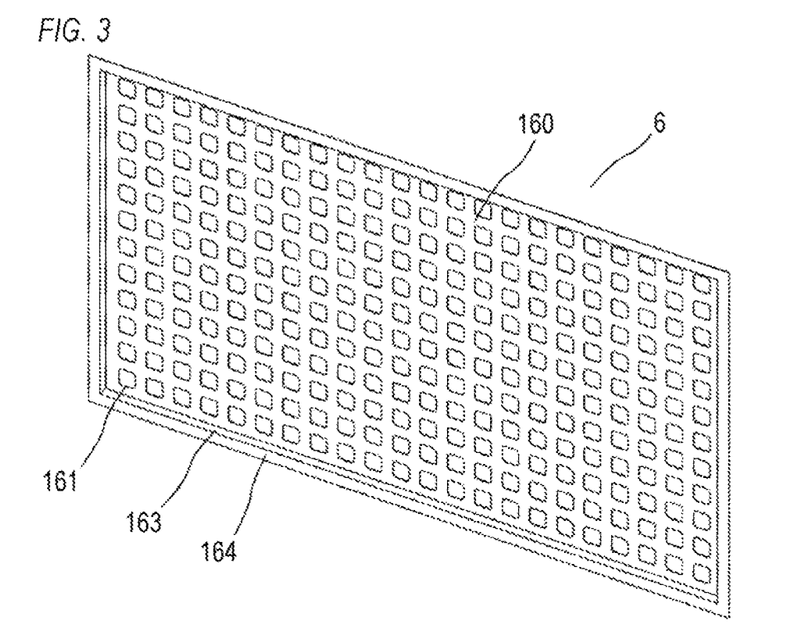
FIG. 3 is a perspective view of a reflection sheet according to Embodiment 1.

FIG. 3 is a perspective view of the reflection sheet 6. The reflection sheet 6 is a member to efficiently reflect the light from the light source board 7 to the liquid crystal panel 3. The reflection sheet 6 is made from a foaming PET material, polypropylene laminated material or the like, and normally has about a 98% reflectance. The reflection sheet 6 is approximately box-shaped, and is normally fabricated by forming, e.g. bending, a sheet material. The reflection sheet 6 includes a base 160 which is approximately parallel with the light source board 7, a side wall 163 which extends vertically from the edge of the base 160 toward the optical sheet 5, and a tab 164 which extends vertically outward from the edge (optical sheet 5 side) of the side wall 163. It is preferable that the reflection sheet 6 is disposed so that the base 160 contacts the light source board 7, but the reflection sheet 6 may be separated from the light source board 7. The base 160 includes openings 161 to expose each light source array 17a, disposed on the light source board 7, to the liquid crystal panel side. In FIG. 3, respective openings 161 are formed to correspond to a plurality of light source arrays 17a, so that one light source array 17a is exposed from one opening 161, but at least two light source arrays 17a may be exposed from one opening 161. Further, respective openings 161 may be formed to correspond to a plurality of light-emitting control blocks 17b, so that one light-emitting control block 17b is exposed from one opening 161.

Figure 4:
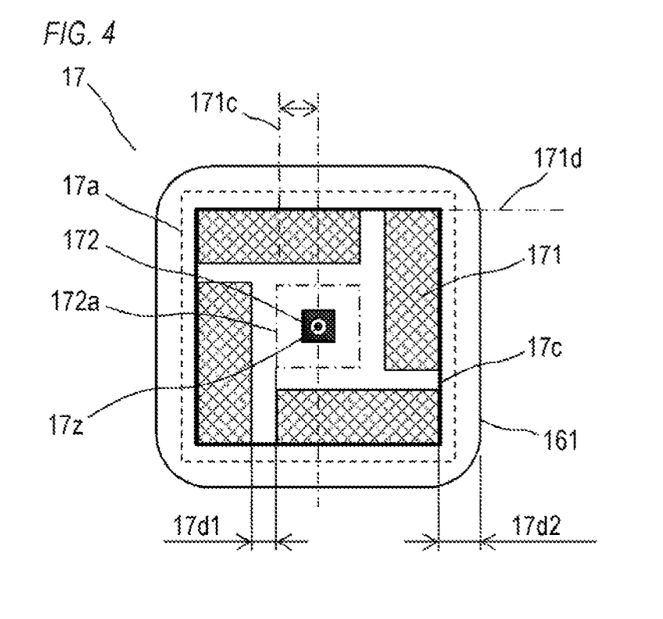
FIG. 4 is a front view of a light source section according to Embodiment 1.
Figure 5:
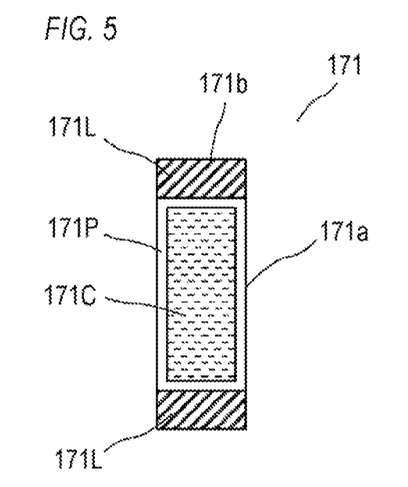
FIG. 5 is a front view of an LED array according to Embodiment 1.

FIG. 4 is a front view of a light source section 17 according to Embodiment 1. The light source section 17 includes the light source array 17a (light source board 7), the temperature sensor 172 (light source board 7) and the opening 161 (reflection sheet 6). FIG. 5 is a front view of an LED 171.

As illustrated in FIG. 5, an outer shape of the LED 171 (circumscribed quadrangle: outer shape of the LED 171 on a plane that is parallel with the light source board 7) in the front view is approximately a rectangle, including a land portion 171L which is electrically connected with the light source board 7, and includes long sides 171a and short sides 171b. The LED 171 has a light-emitting portion 171C at the center of a package 171P, and the shape of the package 171P is a rectangle, for example. The shape of the package 171P may be a square or a circle, but even in this case, the outer shape of the LED 171, including the land portion 171L, is approximately a rectangle.

As described above, in Embodiment 1, one light source array 17a includes four LEDs 171. As illustrated in FIG. 4, the four LEDs 171 are disposed at rotational symmetric positions every 90° with respect to the symmetric axis (rotational symmetric axis) 17z, that is, vertical to the light source board 7. In the front view, a virtual line 171c, which passes through the center of the LED 171 and is parallel with the short side of this LED 171, does not pass through the symmetric axis 17z. In FIG. 4, for electric insulation between an LED 171 and another LED 171, a space 17d1 is created between two LEDs 171 adjacent to each other. Further, as an extended line 171d shown in FIG. 4, an extended line of a long side 171a of one LED 171, out of two LEDs 171 adjacent to each other, approximately matches with an extended line of one short side 171b of the other LED 171. Thereby an area enclosed by an outer periphery 17c of the light source array 17a (minimum quadrangle area enclosing the four LEDs 171) can be minimized, and the opening 161 can be made smaller.

The temperature sensor 172 is disposed in a temperature sensor disposing area 172a surrounded by the four LEDs 171. For electric insulation between the temperature sensor 172 and the LEDs 171, a space 17d1 is created between the temperature sensor disposing area 172a and each of the four LEDs 171. As long as the temperature sensor 172 is disposed in the temperature sensor disposing area 172a, the position of the temperature sensor 172 is not especially limited. However, in order to detect a temperature evenly reflecting the temperature of the four LEDs 171, the position (center) of the temperature sensor 172 is preferably near (in a vicinity of) the center of the light source array 17a, and more precisely near (in a vicinity of) the symmetric axis 17z.

As mentioned above, the opening 161 of the reflection sheet 6 is a member to expose the light source array 17a to the liquid crystal panel 3 side, so that the light from the light source array 17a is emitted to the rear surface of the liquid crystal panel 3 (via various members). The shape, size and the like of the opening 161 are not especially limited, but in FIG. 4, the shape of the opening 161 is approximately quadrangle in the front view, and has a shape that is rotational symmetric with respect to the symmetric axis 17z. Each side of the four sides of the opening 161 is approximately parallel with a long side (or a short side) of any one of the four LEDs, the long side facing the corresponding side. Further, the opening 161 is larger than the area where the light source array 17a is disposed (area surrounded by the outer periphery 17c of the light source array 17a), and the space between each LED 171 and the opening 161 is approximately equal for the four LEDs 171. In concrete terms, a space 17d2 is created between the opening 161 and each of the four LEDs 171. The size of the opening 161 is determined considering the thermal expansion of the reflection sheet 6, displacement due to assembly error and other factors. The corners of the opening 161 are arc-shaped or chamfer-shaped, for example.

As described above, according to Embodiment 1, the temperature sensor 172 is surrounded by the plurality of LEDs 171 in the light source array 17a. Thereby the opening 161, which exposes the light source array 17a, can also expose the temperature sensor 172 and another opening for the temperature sensor 172 need not be formed in the reflection sheet 6. As a result, the surface area of the base 160 of the reflection sheet 6 can be increased (total surface area of the plurality of openings 161 formed on the reflection sheet 6 can be decreased), whereby the light-emitting efficiency of the backlight module 1B can be increased. Furthermore, the temperature sensor 172 is disposed near (in a vicinity of) the LEDs 171, hence the temperature sensor 172 can accurately detect the temperature of each LED 171. In the case of local dimming control, each LED 171 in one light-emitting control block 17b performs similar light emission, hence the temperature in this light-emitting control block 17b becomes approximately uniform. Therefore by disposing respective temperature sensors 172 corresponding to a plurality of light-emitting control blocks 17b, the light emission of each light-emitting control block 17b can be corrected at high precision based on the detection value of the temperature sensor 172 corresponding to this light-emitting control block 17b.

An example of individually controlling the light emission of each light-emitting control block 17b was described, but all the light-emitting control blocks 17b (all the LEDs 171) may be controlled to emit light in the same way. The temperature sensor 172 may be a single temperature sensor element, or may be a temperature detection circuit which includes a temperature sensor element and other electronic elements. In this case as well, the entire temperature detection circuit is disposed in the temperature sensor disposing area 172a.

Embodiment 2

Embodiment 2 of the present invention will be described next. In Embodiment 1, the size of the light source section is determined in accordance with the size of each LED and the space created around the LED. In Embodiment 2, the size of the temperature sensor is further considered. In the following, aspects that are different from Embodiment 1 will primarily be described.

Figure 6:
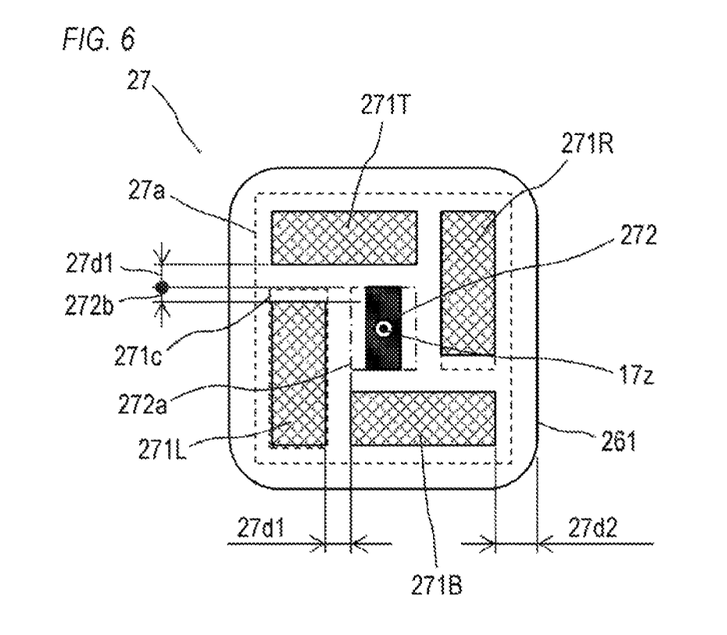
FIG. 6 is a front view of a light source section according to Embodiment 2.

FIG. 6 is a front view of a light source section 27 according to Embodiment 2. As in the case of Embodiment 1, the light source section 27 includes a light source array 27a (light source board 7), a temperature sensor 272 (light source board 7), and an opening 261 (reflection sheet 6). The light source array 27a includes four LEDs (LED 271T, 271B, 271L and 271R). An outer shape of the temperature sensor 272 in the front view is a rectangle, and the temperature sensor 272 protrudes from the temperature sensor disposing area 172a of Embodiment 1 (FIG. 4) in the longer direction of the temperature sensor 272 by the length 272b. Therefore in Embodiment 2, a temperature sensor disposing area 272a, in which the temperature sensor disposing area 172a of Embodiment 1 (FIG. 4) is extended in the longer direction of the temperature sensor 272 by the length 272b, is formed, and the temperature sensor 272 is disposed in this temperature sensor disposing area 272a.

As in the case of Embodiment 1, a space 27d1 is created between each of the four LEDs 271T, 271B, 271L and 271R and the temperature sensor disposing area 272a. Therefore the two LEDs 271T and 271B, disposed in the longer direction of the temperature sensor 272, are disposed at positions that are shifted outward from the positions of Embodiment 1 (longer direction of the temperature sensor 272, and direction moving away from the temperature sensor 272) by the length 272b. The other two LEDs 271L and 271R are disposed in the LED disposing area 271c so that the space with the LED 271T or LED 271B is at least the length 27d1, and the space with the opening 261 is at least the length 27d2. The opening 261 is expanded from the opening 161 in Embodiment 1, so that a space that is at least the length 27d2 is created between the opening 261 and each of the four LEDs 271T, 271B, 271L and 271R, and the light source array 27a is exposed by the opening 261.

As described above, according to Embodiment 2, the size of the temperature sensor 272 is considered, whereby various sizes in the light source section 27 can be determined regardless the size of the temperature sensor 272, so as to implement effects similar to Embodiment 1.

In the example described above, the temperature sensor 272 protrudes from the temperature sensor disposing area 172a of Embodiment 1 (FIG. 4) in the longer direction of the temperature sensor 272 by the length 272b, but the direction and amount of the extension of the temperature sensor are not especially limited. The position of the LED is moved from the position in Embodiment 1 in the direction where the temperature sensor protrudes by the amount of the protrusion of the temperature sensor, and the opening of the reflection sheet is expanded from the opening of Embodiment 1 so that the light source array is exposed, then an effect similar to Embodiment 1 can be implemented.

Embodiment 3

Embodiment 3 of the present invention will be described. In Embodiment 3, an example when a photo-sensor which detects light, specifically a brightness sensor which detects the brightness of light, is disposed instead of the temperature sensor will be described. The photo-sensor may be a sensor which detects the color of the light, or may be a sensor which detects both the brightness and the color of the light. In the following, aspects that are different from Embodiment 1 will be primarily described.

Figure 7:
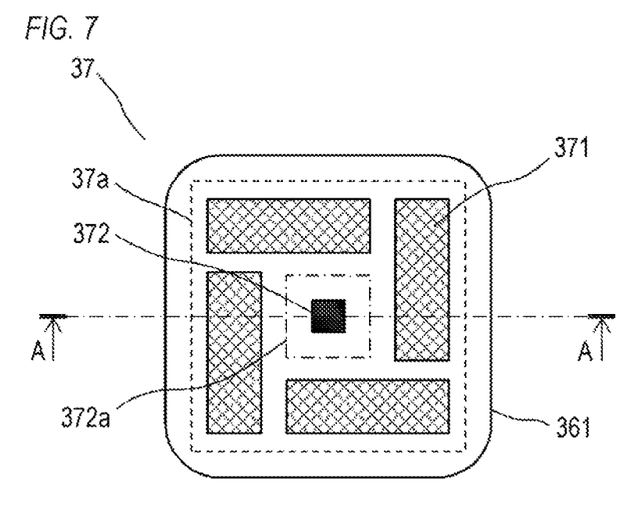
FIG. 7 is a front view of a light source section according to Embodiment 3.

FIG. 7 is a front view of a light source section 37 according to Embodiment 3. The light source section 37 includes a light source array 37a (light source board 7), a brightness sensor 372 (light source board 7), and an opening 361 (reflection sheet 6). The light source array 37a includes four LEDs 371. For all the light-emitting control blocks 17b, respective brightness sensors 372, corresponding to a plurality of light-emitting control blocks 17b, are disposed on the light source board 7, so that the light-emitting control blocks 17b and the brightness sensors 372 correspond one-to-one. A light source control board (not illustrated) individually controls the light emission of each light-emitting control block 17b based on the brightness (detection value) detected by the brightness sensor 372. For example, if the brightness detected by the brightness sensor 372 is lower than the target brightness, the light source control board increases the brightness (light quantity) of the LED 371, so that the brightness to be detected becomes closer to the target brightness.

Figure 8:
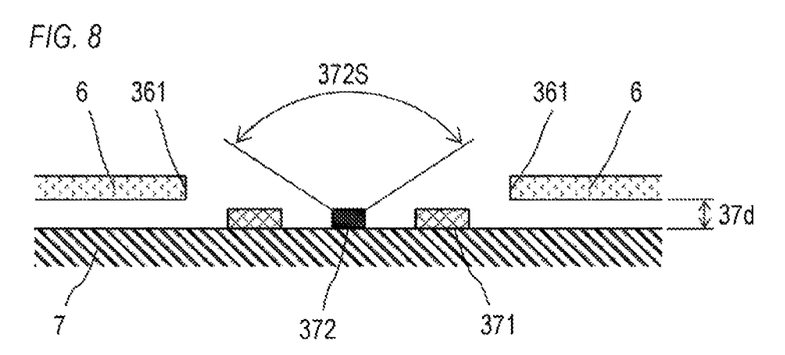
FIG. 8 is a cross-sectional view of a light source section according to Embodiment 3.

FIG. 8 is a cross-sectional view of the light source section 37 at the A-A line in FIG. 7. The brightness sensor 372 disposed on the light source board 7 detects light coming from a brightness detection range 372S on the opposite side of the light source board 7. Therefore for the brightness sensor 372 to accurately detect light, the brightness detection range 372S must not be covered by another member or the like. In Embodiment 3, the opening 361 of the reflection sheet 6 is larger than the area where the light source array 37a is disposed, as in the case of Embodiment 1. Therefore even if a floating portion 37d is generated between the reflection sheet 6 and the light source board 7 due to assembly dispersion, the brightness detection range 372S is less likely to be covered by the reflection sheet 6, and the brightness sensor 372 can accurately detect the brightness.

As described above, according to Embodiment 3, which uses the brightness sensor 372 instead of the temperature sensor 172 of Embodiment 1, the light-emitting efficiency of the backlight module 1B can be increased using a configuration similar to Embodiment 1. Further, the opening 361 of the reflection sheet 6 is larger than the area where the light source array 37a is disposed, hence the brightness detection range 372S is less likely to be covered by the reflection sheet 6, and the brightness sensor 372 can accurately detect the brightness.

Embodiment 4

Embodiment 4 of the present invention will be described next. In Embodiment 4, an example of disposing a plurality of sensors in each light-emitting control block will be described. In the following, aspects that are different from Embodiment 1 will be primarily described.

Figure 9:
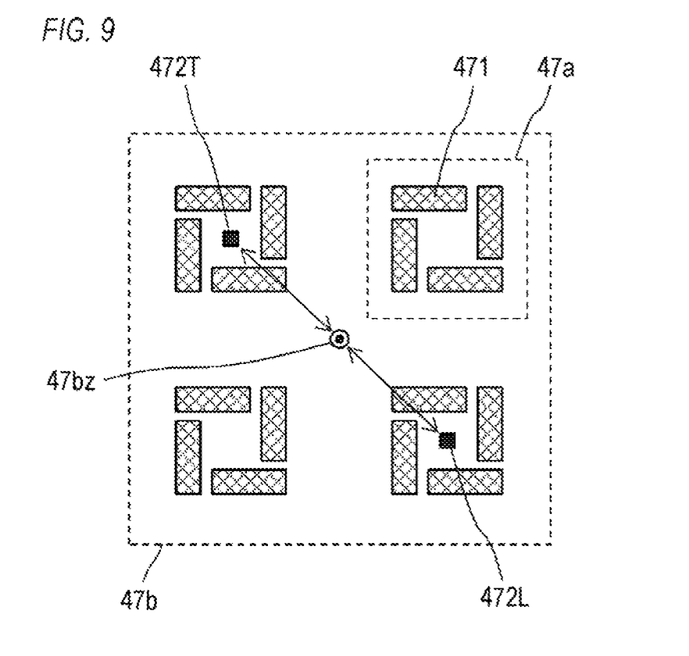
FIG. 9 is a front view of a light-emitting control block according to Embodiment 4.

FIG. 9 is a front view of a light-emitting control block 47b according to Embodiment 4. In Embodiment 4, each light-emitting control block 47b includes a plurality of light source arrays 47a (four light source arrays 47a). In each light-emitting control block 47b, at least one temperature sensor 472T and at least one brightness sensor 472L are disposed. In concrete terms, each light-emitting control block 47b includes at least one light source array 47a constituted of (including) a plurality of LEDs 471 surrounding a corresponding brightness sensor 472L, and at least one light source array 47a constituted of (including) a plurality of LEDs 471 surrounding a corresponding temperature sensor 472T. In FIG. 9, one light-emitting control block 47b includes one light source array 47a constituted of (including) four LEDs 471 surrounding the brightness sensor 472L, and one light source array 47a constituted of (including) four LEDs 471 surrounding the temperature sensor 472T.

As described above, according to Embodiment 4, the temperature sensor 472T and the brightness sensor 472L are disposed in one light-emitting control block 47b. As described in Embodiment 1, in the case of the local dimming control, each LED 471 in one light-emitting control block 47b performs similar light emission, hence the temperature in this light-emitting control block 47b is approximately uniform. In other words, the temperature of the brightness sensor 472L corresponding to the light-emitting control block 47b can be accurately detected by the temperature sensor 472T corresponding to this light-emitting control block 47b. Therefore based on the detection value (temperature detection value) of the temperature sensor 472T, the detection value (brightness detection value) of the brightness sensor 472L can be accurately corrected, so that the change in the detection value of the brightness sensor 472L, caused by the change in the temperature of the brightness sensor 472L, is suppressed. Then based on the corrected brightness detection value, the light emission of the light-emitting control block 47b can be accurately corrected, so that the change of the light-emitting characteristic of the LED 471, caused by the change of the temperature, deterioration and the like of the LED 471, is suppressed. Further, the light-emitting efficiency of the backlight module 1B can be increased using a configuration similar to Embodiment 1.

The arrangement of the brightness sensor 472L and the temperature sensor 472T in the same light-emitting control block 47b is not especially limited. However a concentric temperature distribution centered around the center 47bz of the light-emitting control block 47b may be generated by local dimming control or the like. Therefore it is preferable that the distance from the center 47bz of the light-emitting control block 47b to the brightness sensor 472L is approximately equal to the distance from the center 47bz to the temperature sensor 472T. Then even if the above mentioned concentric temperature distribution is generated, the temperature sensor 472T can accurately detect the temperature of the brightness sensor 472L.

Embodiment 5

Embodiment 5 of the present invention will be described next. In Embodiment 5, an example when the light source array includes five LEDs will be described. In the following, aspects that are different from Embodiment 1 will be primarily described.

Figure 10:
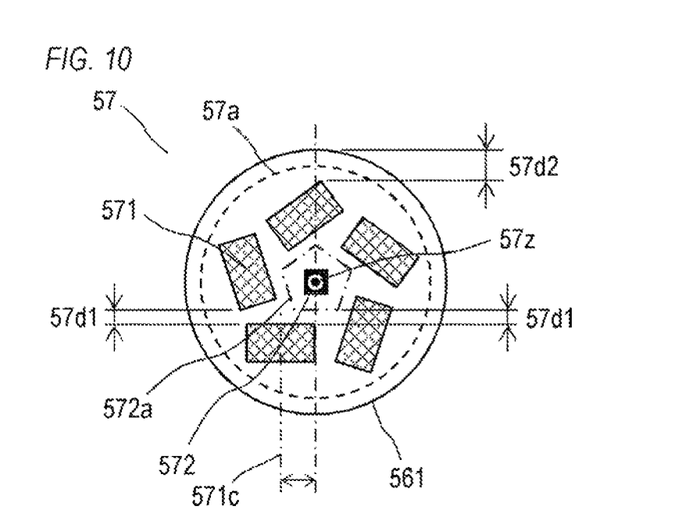
FIG. 10 is a front view of a light source section according to Embodiment 5.

FIG. 10 is a front view of a light source section 57 according to Embodiment 5. As in the case of Embodiment 1, the light source section 57 includes a light source array 57a (light source board 7), a temperature sensor 572 (light source board 7), and an opening 561 (reflection sheet 6). The light source array 57a includes five LEDs 571.

As in the case of Embodiment 1, the five LEDs 571 are disposed in rotational symmetric positions with respect to the symmetric axis 57z, that is, vertical to the light source board 7, and a virtual line 571c, which passes through the center of the LED 571 and is parallel with the shorter side of this LED 571, does not pass through the symmetric axis 57z. In Embodiment 1, the rotation angle of the rotational symmetry of the LEDs 171 (FIG. 4) is 90° (=360°/number of LEDs 171 =360°/4), but in Embodiment 5, the rotation angle of the rotational symmetry of the LEDs 571 is 72° (=360°/5).

Further, as in the case of Embodiment 1, a temperature sensor disposing area 572a is surrounded by five LEDs 571, and a space 57d1 is created between the temperature sensor disposing area 572a and each of the five LEDs 571. A temperature sensor 572 is disposed in the temperature sensor disposing area 572a (center of light source array 57a). Here the shape of the temperature sensor disposing area 572a is a pentagon, corresponding to the five LEDs 572.

The opening 561 of the reflection sheet 6 is formed so that a space of at least the length 57d2 is created between the opening 561 and the outer periphery of the light source array 57a. In FIG. 10, a space 57d2 is created between the opening 561 and each of the five LEDs 571. The shape of the opening 561 is a circle, for example. The shape of the opening 561 may be a pentagon corresponding to the five LEDs 571, and may be changed in accordance with the processing cost to form the opening 561 and various factors including a reflection surface area required for the reflection sheet 6.

As described above, according to Embodiment 5, the light source array 57a includes five LEDs 571, but the configuration is similar to Embodiment 1, such as the temperature sensor 572 being surrounded by the five LEDs 571, therefore an effect similar to Embodiment 1 is implemented.

In the example described above, the light source array 57a includes five LEDs 571, but a number of LEDs 571 included in the light source array 57a is not especially limited, and may be fewer than four or more than five. Since the configuration is similar to Embodiment 1, such as the temperature sensor 572 being surrounded by a plurality of LEDs 571, an effect similar to Embodiment 1 is implemented. A number of LEDs 571, the arrangement of LEDs 571, the shape of the opening 561 of the reflection sheet 6 and the like can be changed within the scope of the essence of the present invention. For example, a plurality of LEDs 571 may be disposed at rotational symmetric positions at a rotation axis in accordance with a number of LEDs 571. The shape of the opening 561 may be a polygon corresponding to a number of LEDs 571, or may be a circle.

Embodiment 6

Embodiment 6 of the present invention will be described next. In Embodiment 6, an example when the shape of the LED is a circle will be described. In the following, the aspects that are different from Embodiment 1 will be primarily described.

Figure 11:
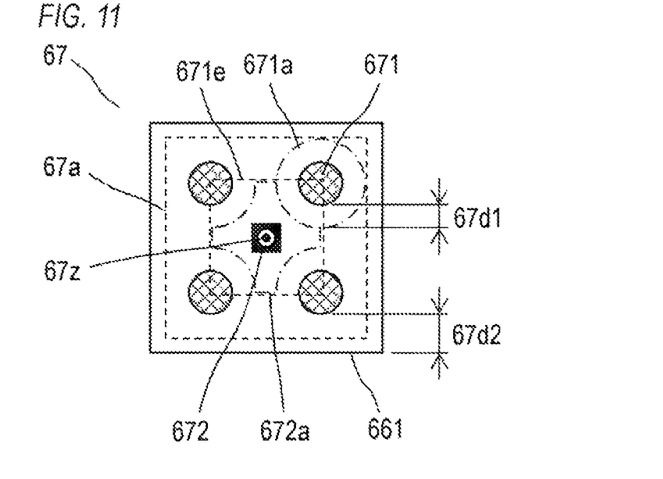
FIG. 11 is a front view of a light source section according to Embodiment 6.

FIG. 11 is a front view of a light source section 67 according to Embodiment 6. As in the case of Embodiment 1, the light source section 67 includes a light source array 67a (light source board 7), a temperature sensor 672 (light source board 7), and an opening 661 (reflection sheet 6). The light source array 67a includes four LEDs 671. The shape of the LED 671 in the front view is a circle. The four LEDs 671 are disposed in rotational symmetric positions with respect to the symmetric axis (rotational symmetric axis) 67z, which is vertical to the light source board 7 every 90°.

As in the case of Embodiment 1, a space 671a is created around each LED 671, and other members cannot be disposed in the spaces 671a. The temperature sensor 672 is surrounded by the four LEDs 671, and is disposed in the temperature sensor disposing area 672a enclosed by a virtual line 671e which does not overlap with the space 671a around each LED 671 and connects the center of each LED 671. The temperature sensor disposing area 672a can be defined as an "area of the quadrangle of which apex is the center of each LED 671, excluding the space 671a around each LED 671".

The opening 661 of the reflection sheet 6 is formed so that a space of which length is at least 67d2 is created from each LED 671, as in the case of Embodiment 1. In FIG. 11, the space 67d2 is created between the opening 661 and each of the four LEDs 671. The shape of the opening 661 is quadrangle, for example.

As described above, according to Embodiment 6, the shape of the LED 671 is a circle, but the configuration is similar to Embodiment 1, such as the temperature sensor 672 being surrounded by a plurality of LEDs 671, therefore an effect similar to Embodiment 1 is implemented. The shape of the LED 671 is not especially limited, and may be a polygon, such as hexagon and octagon, and may or may not be a regular polygon, such as square. Because of the configuration similar to Embodiment 1, such as the temperature sensor 672 being surrounded by a plurality of LEDs 671, an effect similar to Embodiment 1 can be implemented.

Embodiments 1 to 6 (including the modifications described above) are merely examples, and the present invention includes configurations implemented by appropriately modifying or changing the configurations of Embodiments 1 to 6 within the scope of the essence of the present invention. The present invention also includes configurations implemented by appropriately combining the configurations of Embodiments 1 to 6.

According to this disclosure, a drop in the light-emitting efficiency of a light-emitting apparatus caused by installing sensors in the light-emitting apparatus can be suppressed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-147579, filed on Aug. 9, 2019, which is hereby incorporated by reference herein in its entirety.

What is claimed is:

1. A light-emitting apparatus comprising:
a light source board on which a first light source group including a plurality of light sources and a sensor that detects light or temperature are disposed; and
a reflection sheet that is disposed on a side of the light source board where the first light source group and the sensor are disposed, an opening from which the first light source group is exposed being formed on the reflection sheet,
wherein the sensor is surrounded by the plurality of light sources,
the plurality of light sources are disposed in rotational symmetric positions, and
on a plane that is parallel with the light source board,
each of the plurality of light sources has a substantially rectangular shape, and
for each of the plurality of light sources, a virtual line which passes through a center of the light source and is parallel with a short side of the light source, does not pass through the rotational symmetric axis.

2. The light-emitting apparatus according to claim 1, wherein the sensor is disposed substantially at a center of the first light source group.

3. The light-emitting apparatus according to claim 1, wherein the opening is larger than an area in which the first light source group is disposed.

4. The light-emitting apparatus according to claim 1, wherein a space between the light source and the opening is substantially equal among the plurality of light sources.

5. The light-emitting apparatus according to claim 1, wherein the opening has a rotational symmetric shape with respect to a rotational symmetric axis of the plurality of light sources.

6. The light-emitting apparatus according to claim 5, wherein the sensor is disposed in a vicinity of the rotational symmetric axis.

7. The light-emitting apparatus according to claim 1, wherein the plurality of light sources are four light sources, and
on the plane that is parallel with the light source board,
in two light sources adjacent to each other among the plurality of light sources, an extended line of one long side of one light source substantially matches with an extended line of one short side of the other light source.

8. The light-emitting apparatus according to claim 7, wherein on the plane that is parallel with the light source board,
the opening has a substantially quadrangular shape, and
for each of a plurality of sides of the opening, the side is substantially parallel with a long side of one of the plurality of light sources, the long side facing the side.

9. The light-emitting apparatus according to claim 1, wherein on the light source board,
a plurality of second light source groups each of which includes of one or more first light source groups, and each light emission of which is individually controlled, and
a plurality of sensors each of which detects light or temperature, and which respectively correspond to the plurality of second light source groups,
are disposed.

10. A display apparatus comprising:
the light-emitting apparatus according to claim 1; and
a display panel that displays an image by transmitting light emitted from the light-emitting apparatus.

11. A light-emitting apparatus comprising:
a light source board on which a first light source group including a plurality of light sources and a sensor that detects light or temperature are disposed; and
a reflection sheet that is disposed on a side of the light source board where the first light source group and the sensor are disposed, an opening from which the first light source group is exposed being formed on the reflection sheet,
wherein the sensor is surrounded by the plurality of light sources,
wherein on the light source board,
a plurality of second light source groups each of which includes of one or more first light source groups, and each light emission of which is individually controlled
a plurality of photo-sensors each of which detects light, and which respectively correspond to the plurality of second light source groups, and
a plurality of temperature sensors each of which detects temperature, and which respectively correspond to the plurality of second light source groups,
are disposed, and
wherein each of the plurality of second light source groups includes: a first light source group including a plurality of light sources surrounding a corresponding photo-sensor; and another first light source group including a plurality of light sources surrounding a corresponding temperature sensor.

12. The light-emitting apparatus according to claim 11, wherein for each of the plurality of second light source groups, a distance from a center of the second light source group to the photo-sensor corresponding to the second light source group is substantially equal to a distance from the center of the second light source group to the temperature sensor corresponding to the second light source group.

13. A display apparatus comprising:
the light-emitting apparatus according to claim 11; and
a display panel that displays an image by transmitting light emitted from the light-emitting apparatus.

* * * * *